US008849444B2

(12) United States Patent
George

(10) Patent No.: US 8,849,444 B2
(45) Date of Patent: Sep. 30, 2014

(54) SLIPCOVER METHOD AND SYSTEM

(71) Applicant: Regina George, McComb, OH (US)

(72) Inventor: Regina George, McComb, OH (US)

( * ) Notice: Subject to any disclaimer, the term of this patent is extended or adjusted under 35 U.S.C. 154(b) by 26 days.

(21) Appl. No.: 13/764,921

(22) Filed: Feb. 12, 2013

(65) Prior Publication Data

US 2013/0205555 A1 Aug. 15, 2013

Related U.S. Application Data

(60) Provisional application No. 61/598,989, filed on Feb. 15, 2012.

(51) Int. Cl.
*G06F 19/00* (2011.01)
*A47C 31/11* (2006.01)
*B68G 7/00* (2006.01)

(52) U.S. Cl.
CPC .. *B68G 7/00* (2013.01); *A47C 31/11* (2013.01)
USPC .......................................................... 700/131

(58) Field of Classification Search
USPC .................................................. 700/130–133
See application file for complete search history.

(56) References Cited

U.S. PATENT DOCUMENTS

| | | | | |
|---|---|---|---|---|
| 4,598,376 | A * | 7/1986 | Burton et al. | 700/132 |
| 4,613,866 | A * | 9/1986 | Blood | 342/448 |
| 6,389,322 | B1 * | 5/2002 | Park et al. | 700/131 |
| 6,519,550 | B1 * | 2/2003 | D'Hooge et al. | 702/167 |
| 6,882,953 | B2 * | 4/2005 | D'Hooge et al. | 702/150 |
| 8,229,208 | B2 * | 7/2012 | Pulla et al. | 382/154 |
| 8,533,967 | B2 * | 9/2013 | Bailey et al. | 33/503 |
| 2003/0028347 | A1 * | 2/2003 | D'Hooge et al. | 702/152 |
| 2004/0162700 | A1 * | 8/2004 | Rosenberg et al. | 702/168 |
| 2007/0198118 | A1 * | 8/2007 | Lind | 700/138 |
| 2009/0034677 | A1 * | 2/2009 | Prestidge et al. | 377/2 |
| 2009/0070585 | A1 * | 3/2009 | Prestidge et al. | 713/168 |

* cited by examiner

*Primary Examiner* — Nathan Durham
(74) *Attorney, Agent, or Firm* — Fraser Clemens Martin & Miller LLC; Jacob M. Ward

(57) ABSTRACT

A method and system that allows a user to create patterns for removable furniture covers employs a data input device to trace a piece of furniture. The data input device is traced over predetermined areas of the furniture known to those in the art of furniture cover design. The data input device transfers the trace data to a processor that renders an image of the traced portion of the piece of furniture. The processor permits the user to print off, or output to a cutter, appropriately shaped working patterns to cover the predetermined areas, and to assemble a removable furniture cover or slipcover for the piece of furniture.

10 Claims, 6 Drawing Sheets

SLIPCOVER METHOD AND SYSTEM

CROSS-REFERENCE TO RELATED APPLICATIONS

This application claims the benefit of U.S. Patent Application No. 61/598,989 filed on Feb. 15, 2012. The entire disclosure of the above application is hereby incorporated herein by reference.

FIELD OF THE INVENTION

The present disclosure relates to methods and systems for creating furniture slipcovers and, in particular, a method and a system for generating individual fabric pieces from trace data collected for a specific piece of furniture.

BACKGROUND OF THE INVENTION

A slipcover is a removable furniture cover generally used in the furniture industry in lieu of fully reupholstering a piece of furniture. A slipcover may be applied to a piece of furniture, for aesthetic purposes, in order to change the appearance, or for functional purposes such as protecting the furniture from degradation. While universal slipcovers are available, they are prone to improper fit which can affect the aesthetics of the slipcover, and make the slipcover more difficult to install on the furniture piece. To achieve an optimal fit, common slipcovers are custom made to ensure they fit a respective furniture piece.

Producing a custom slipcover typically requires manual measurement of a furniture piece, creating individual fabric panels based off these measurements, and sewing the fabric panels together. The fabric panels generally correspond to the external surfaces of the respective piece of furniture, such as the arms, back, and seat. This manual process is not exact, and requires a degree of craftsmanship to properly size the individual panels and ensure a clean fit. The process becomes increasingly more difficult as curves and complexities are introduced to the shape of a furniture piece.

There is a continuing need for a method and system to improve the manufacture of furniture slipcovers. Desirably, the system allows electronic measurement of a furniture piece and automatically generates the individual panel shapes of the furniture slipcover. The system accounts for curvature and complexities in the furniture piece in determining a proper size and shape of each respective panel. The desirable system improves quality and efficiency, allowing an upholsterer to produce slipcovers in a more cost effective manner.

SUMMARY OF THE INVENTION

In concordance with the instant disclosure, a method of producing customized slipcovers for individual pieces of furniture, performed by taking electronic measurements of a respective furniture piece and generating an output of the necessary slipcover panel shapes, is surprisingly discovered.

In one embodiment, a method for manufacturing a slipcover for a furniture piece includes a step of measuring the furniture piece with a data input device to acquire trace data. A plurality of working patterns is then created for the slipcover from the trace data. A plurality of fabric panels are then cut based upon the working patterns for the slipcover. The fabric panels are assembled to form the slipcover for the furniture piece.

In an exemplary embodiment, a method of generating slipcovers involves the upholsterer using a data input device, such as a coordinate measurement machine or an electric stylus, to trace the outer profile of the furniture piece. The upholsterer then transfers this data to a processor that converts the trace data into a digital image of the furniture piece. Using this digital image, the processor will generate the necessary patterns for the fabric panels to be sewn together by the upholsterer. The processor then communicates these patterns to a two-dimensional output, such as a cutter or plotter. Upon cutting the respective panel shapes, the upholsterer then sews the panels together to form the slipcover.

In another embodiment, a system for manufacturing a slipcover for a furniture piece, includes a data input device, a memory, and a processor. The data input device is configured to generate trace data indicative of a shape of a surface of the furniture piece. The memory is in communication with the data input device. The memory includes at least one database for receiving the generated trace data. The processor is in communication with the memory. The processor executes instructions to render a plurality of working patterns based upon the trace data from the data input device.

In an illustrative embodiment, a system has an electronic coordinate measurement device, a data processor, a two-dimensional output such as a plotter or cutter, and a fabrication device for joining the fabric panels into a completed slipcover. The coordinate measurement device is a handheld electric stylus, capable of recording a trace path along the furniture piece as the upholsterer outlines the profile of the furniture piece's exterior. The trace paths can be transferred to the processor in real-time, or can be stored on the internal memory of the stylus and transferred at a later time. In this embodiment, the data processor comprises a laptop computer that the upholsterer can take on-site, allowing instantaneous viewing of the trace data as it is taken. Upon transfer of the trace data into the processing program, the program generates a series of two-dimensional working patterns for fabric panels. These patterns are then output to a plotter or cutter to be sewn together by the upholsterer.

In another embodiment, a system has an electronic coordinate measurement device, a data processor, a two-dimensional output such as a plotter or cutter, and a fabrication device for joining the fabric panels into a completed slipcover. The coordinate measurement device is a portable coordinate measurement machine comprising an articulated arm with connected to a stylus. The portable coordinate measurement machine is capable of collecting an infinite number of positional coordinates relating to the external profile of the furniture piece external profile, and creating a three-dimensional digital model of the furniture piece. This three-dimensional model is then run through the processor, wherein the processor generates a best-fit slipcover. The processor then further generates the respective panel shapes necessary to construct the slipcover. These panel shapes are then output to a plotter or cutter to be sewn together by the upholsterer.

In yet another embodiment, a system has an electronic coordinate measurement device, a data processor, a two-dimensional output such as a plotter or cutter, and a fabrication device for joining the fabric panels into a completed slipcover. The coordinate measurement device is a laser scanner capable of generating a three-dimensional model of the furniture piece by scanning the furniture piece with a laser. This data is then communicated to the processor in a manner similar to that of the previous embodiment.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
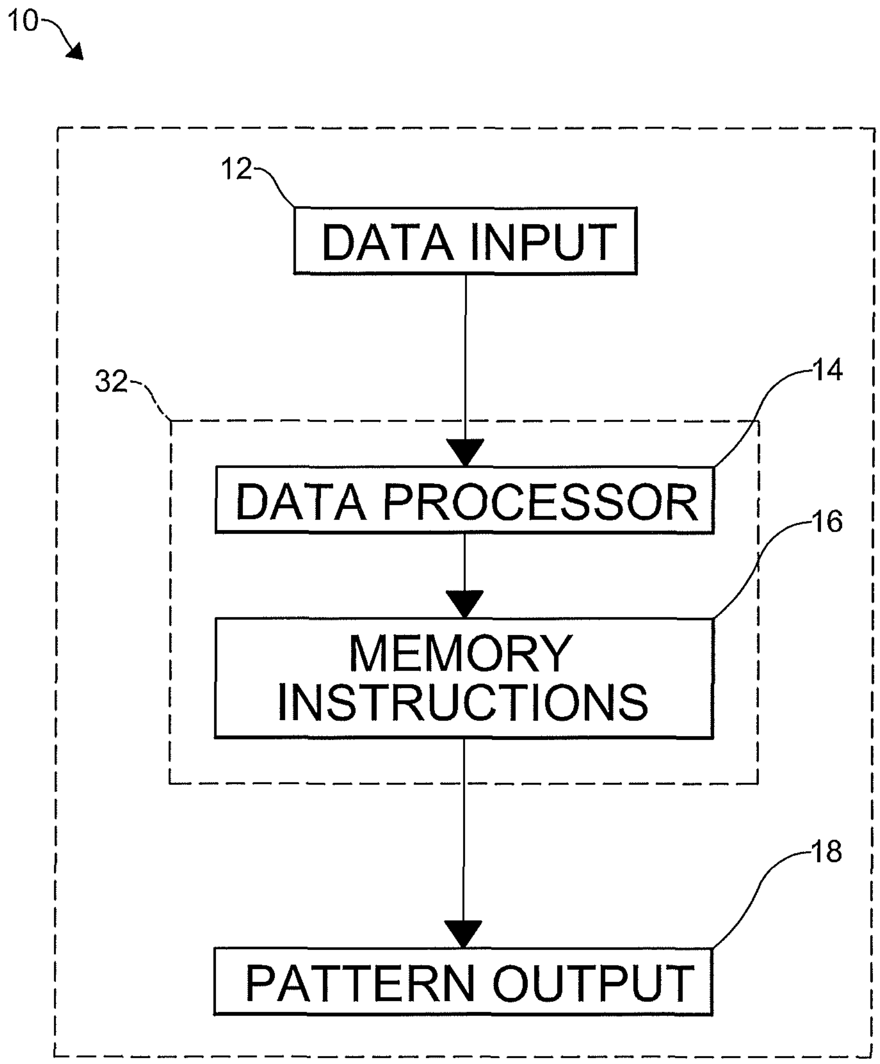
FIG. 1 is a schematic block diagram illustrating the components of a system for creating a custom slipcover in accordance with the present disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

In FIG. 1, a system 10 for manufacturing a custom furniture slipcover 54 is shown. The system 10 includes a data input device 12, a data processor 14, a memory with instructions 16 embodied thereon, and an output device 18.

Figure 3:
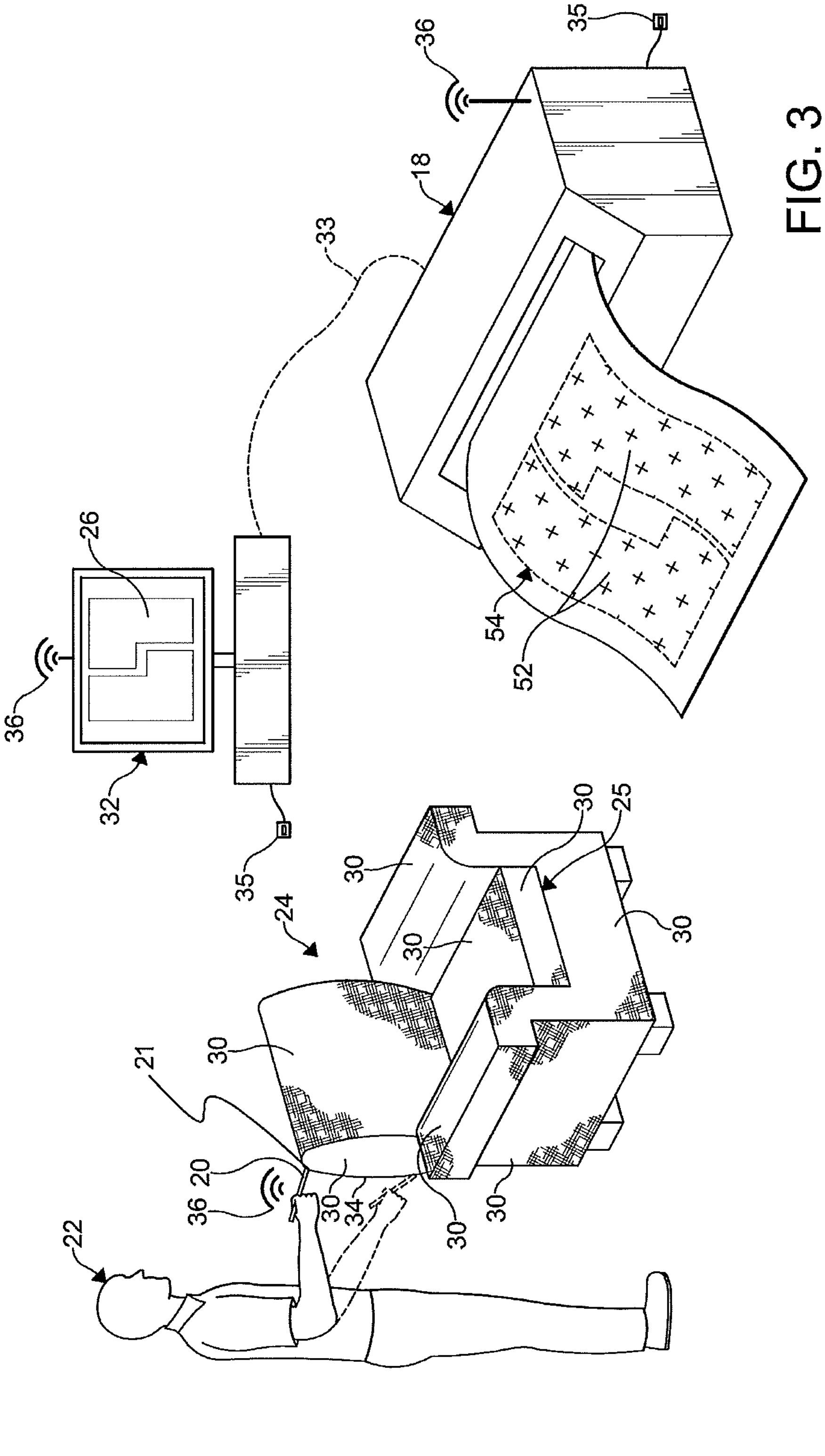
FIG. 3 is a front perspective view showing an embodiment of the system and method in accordance with the present disclosure.

In a particular embodiment, the data input device 12 is a handheld electric stylus 20, as shown in FIG. 3. The stylus 20 has the capability to track relative motion of a tip of the stylus 20 using a position sensor 21. As nonlimiting examples, the motion of the tip of the stylus 20 may be tracked using the position sensor 21 such as an optical sensor or a roller ball. The motion may also be tracked by motion sensors such as accelerometers and gyroscopic devices, e.g., 3-axis MEMS-based gyroscopes. One of ordinary skill in the art may select other methods for detecting motion of the stylus 20, as desired.

An operator 22 uses the stylus 20 to trace an external profile of faces of the furniture piece 24. The trace paths may then stored in a memory of the stylus 20. The trace data may be transferred to a personal computer 32 by the operator 22 at a later time, for example.

One skilled in the art will appreciate that the memory need not be internal to the stylus 20, but may also be a remote memory, such as a memory of the personal computer 32 with which the stylus 20 is in real-time communication as trace data is collected. Communication between the stylus 20 and the personal computer 32 may be a hard connection such as universal serial bus (USB) or Ethernet, or may be done wirelessly over Wi-Fi, Bluetooth or any other means wireless data communication.

In another embodiment, data input device 12 may be a coordinate measurement machine used to collect three-dimensional location data from the exterior profile of the furniture piece 24. The coordinate measurement machine may be a six-axis or seven-axis articulable arm, for example, capable of reaching all exterior positions of the furniture piece 24 to create a digital image of the furniture piece 24. The data input device 12 may also comprise a laser scanner, capable of digitizing the furniture piece's external profile by scanning the furniture piece 24 with a laser beam. Other types of data input devices 12 may also be employed within the scope of the disclosure.

Once trace data is collected by the data input device 12, it is communicated to the processor 14. In one embodiment, the data input device 12 has its own data memory capable to storing trace data as it is acquired. The data input device 12 would then be connected to the data processor 14 via a USB. In other non-limiting examples, the data input device 12 may be connected to the data processor 14 via wireless connection such as a WAN, Bluetooth, or RF Chip. It may also be appreciated that the data input device 12 may transmit trace data to the data processor in real-time as the data is collected by the operator 22.

In a particular embodiment, the processor 14 executes instructions embodied on the memory, which memory is a tangible computer readable medium such as a hard disk drive or flash drive, as nonlimiting examples. The instructions, where executed by the processor 14, facilitates an interpretation of the trace data received from the data input device 12, and converts the trace data into a digital image of the furniture piece. The digital image may be images of each surface traced, or may be a composite or three dimensional image including all surfaces traced, as desired. The processor 14 then evaluates the digital image and generates working patterns 26 that correspond to the optimally shaped fabric panels 28 necessary to manufacture a slipcover 30.

The operator 22 may also be permitted by the processor and instructions to change the size and shape of working patterns 26 for generating the fabric panels. For example, an operator may wish to allow extra material for trimming after completion of the slipcover 30. The operator may adjust this setting prior to generating the working patterns 26. The processor also allows the operator to tweak the generated patterns 26 individually to accommodate variables associated with the preparation of the slipcover 30.

Once the operator 22 is satisfied with the working patterns 26, the processor 14 will generate instructions 16 to be sent to the output device 18. In one embodiment, the executed instructions 16 will create the working patterns 26 as a digital drawing format, such as a PDF, JPEG, or TIFF file format. In this embodiment, the working patterns 26 may be communicated to the output device 18 capable of printing or projecting the patterns onto a fabric. The working patterns 26 may also be output as a standard CAD file format to allow the patterns 26 to be loaded into an automatic fabric cutter.

Figure 2:
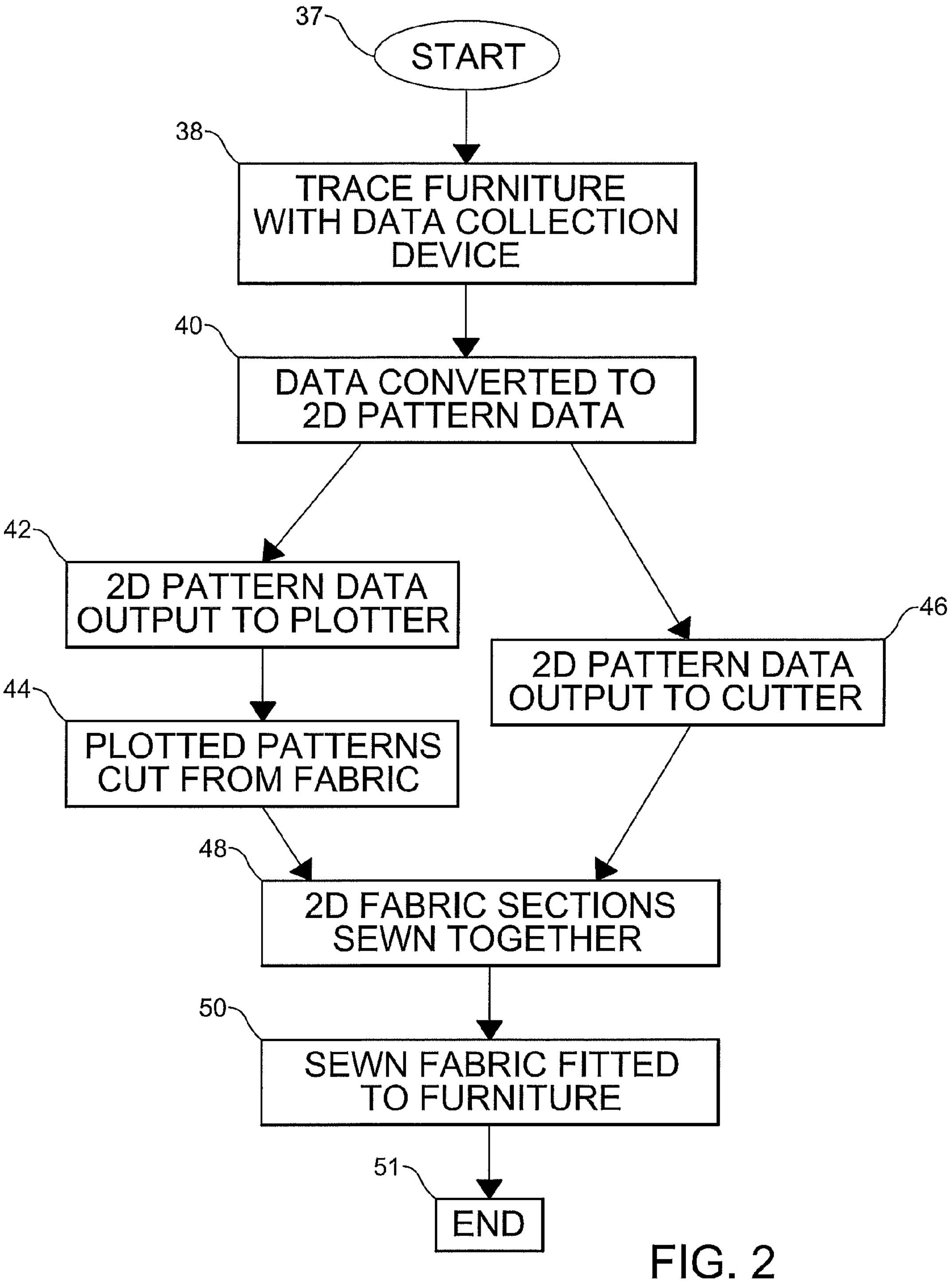
FIG. 2 is a flow diagram of a method for creating a custom slipcover in accordance with one embodiment of the present disclosure.

There is shown in FIG. 2 a flow diagram of a method according to the present disclosure. The method starts at circle 37. From there, the operator 22 executes step 38 by tracing various exterior faces 30 of the furniture piece 24 with the data input device 12, for example, the stylus 20. In a particular method the operator 22 collects the dimensional data by tracing the exterior faces 30 of the furniture piece 24 with the stylus 20. As described hereinabove, the stylus 20 may include a pen-shaped mechanism capable of detecting relative motion as the tip of the stylus 20 is moved along a surface.

To collect trace data of the furniture piece 24, the operator 22 places the tip of the stylus 20 against the surface of the furniture piece which the operator 22 intends to trace. The operator 22 then initiates data acquisition, for example, by pressing a button on the stylus 20. The operator 22 then moves the tip of the stylus 20 along the boundary 34 of the exterior faces 30, thus generating trace data for that face of the furniture piece.

Upon completion of tracing for a respective surface, the operator 22 terminates data acquisition and the trace data is saved, for example, in either the internal memory of the stylus 20 or in a remote memory of the personal computer 32. This step 38 is then repeated for each exterior face 30 of the furniture piece 24. Exterior faces 30 of the seat cushion 25 may also be traced where the operator desires the seat cushion 25 to remain separate from the furniture piece 24.

In another embodiment, the operator 22 may acquire dimensional data in step 38 using a three-dimensional coordinate measurement machine, such as an articulable arm or a laser scanner. Using the articulable arm, the operator 22 will collect a series of coordinates by touching the measuring tip of the arm upon a plurality of determined spaced measurement points on the exterior of the furniture piece 24.

The spacing of the measurement points is dependent on the preference of the operator 22 for more or less precise conceptualization of the shape of the furniture piece 24. For a complex furniture piece 24, for example, with elaborate curvature or shapes, the operator 22 will desire a higher concentration of measuring points than would an operator 22 taking measurements off of a simple furniture piece 24 with only flat faces.

Once the data collection step 38 is completed, the trace data is communicated from the data input device 12 to the processor 14. In a particular embodiment, communication between the data input device 12 and the processor 14 may be performed by the operator 22 connecting a USB plug on the data input device 12 to a USB port 35 on the personal computer 32. In other embodiments, communication between the data input device 12 and the personal computer 32 may be done through a means of wireless communication 36.

In a next step 40 of the method, the processor 14 will convert the respective shapes of the trace data into a composite model of the furniture piece 24. The operator 22 then adjusts the dimensions of the composite model of the furniture piece 24 to accommodate any errors in the trace data. Once the operator 22 is satisfied with the dimensions of composite model of the furniture piece 24, the operator 22 submits the model to the processor 14 to generate working patterns 26 for the necessary pieces of the slipcover 54. The working patterns 26 generated are configured by the processor 14 to provide the slipcover 54 with an optimal fit over the furniture piece 24. After generation of the working patterns 26 the operator again has the ability to make adjustments to the individual working patterns 26 to accommodate the fabrication process.

In the third step 42 of the method, the processor 14 communicates the working pattern 26 data to the output device 18. In one embodiment, the output device 18 is an automatic fabric cutter 44. In this embodiment, the operator 22 instructs the processor 14 to record the working patterns 26 as two-dimensional CAD/CAM compatible file formats. The files are then communicated to a CNC program to control the fabric cutter 44. The fabric cutter 44 cuts all necessary fabric panels 56 from a sheet of fabric and the operator 22 is supplied with all necessary panels of the desired slipcover.

One skilled in the art will appreciate that the output device 18 of the third step 42 may alternatively comprise a plotter to which the processor 14 would communicate working pattern 56 shape data in an image format. In this embodiment, the plotter reproduces this shape data on a sheet of paper or directly onto fabric, and the operator 22 would be required to complete step 44 by manually cutting the fabric panels 56 based on the paper forms from the desired fabric.

Communication between the processor 14 and output device 18 can be accomplished through numerous means. In a primary embodiment, the processor is provided in a personal computer 32 that is in direct communication with the output device 18, either through a wired connection 33 or through a wireless communication. In another embodiment, the processor 14 and output device 18 may both be embodied within a single machine, capable of receiving trace data from the data input 14, processing trace data, and outputting necessary fabric panels 56.

In step 48 of the invented method 28, the individual fabric panels 56 are sewn together by the operator 22 along their respective edges 58 to create a completed slipcover 54. The fabricated slipcover 54 is then fitted over the furniture piece 24 in step 50 of the method, and the method is completed 51.

Figure 4A:
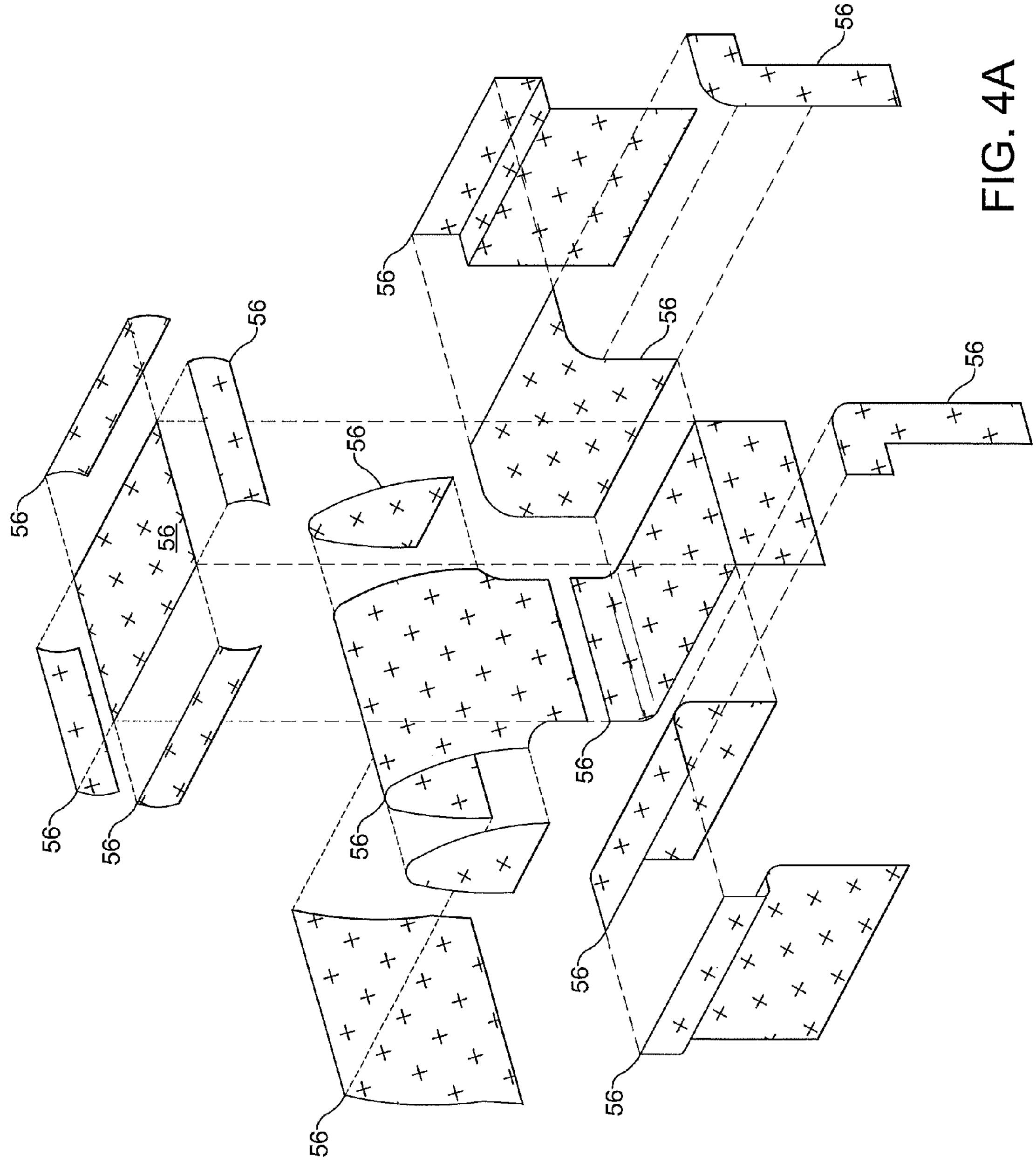
FIG. 4A is a front perspective exploded view of the components of a slipcover in accordance with an embodiment of the present disclosure.
Figure 4B:
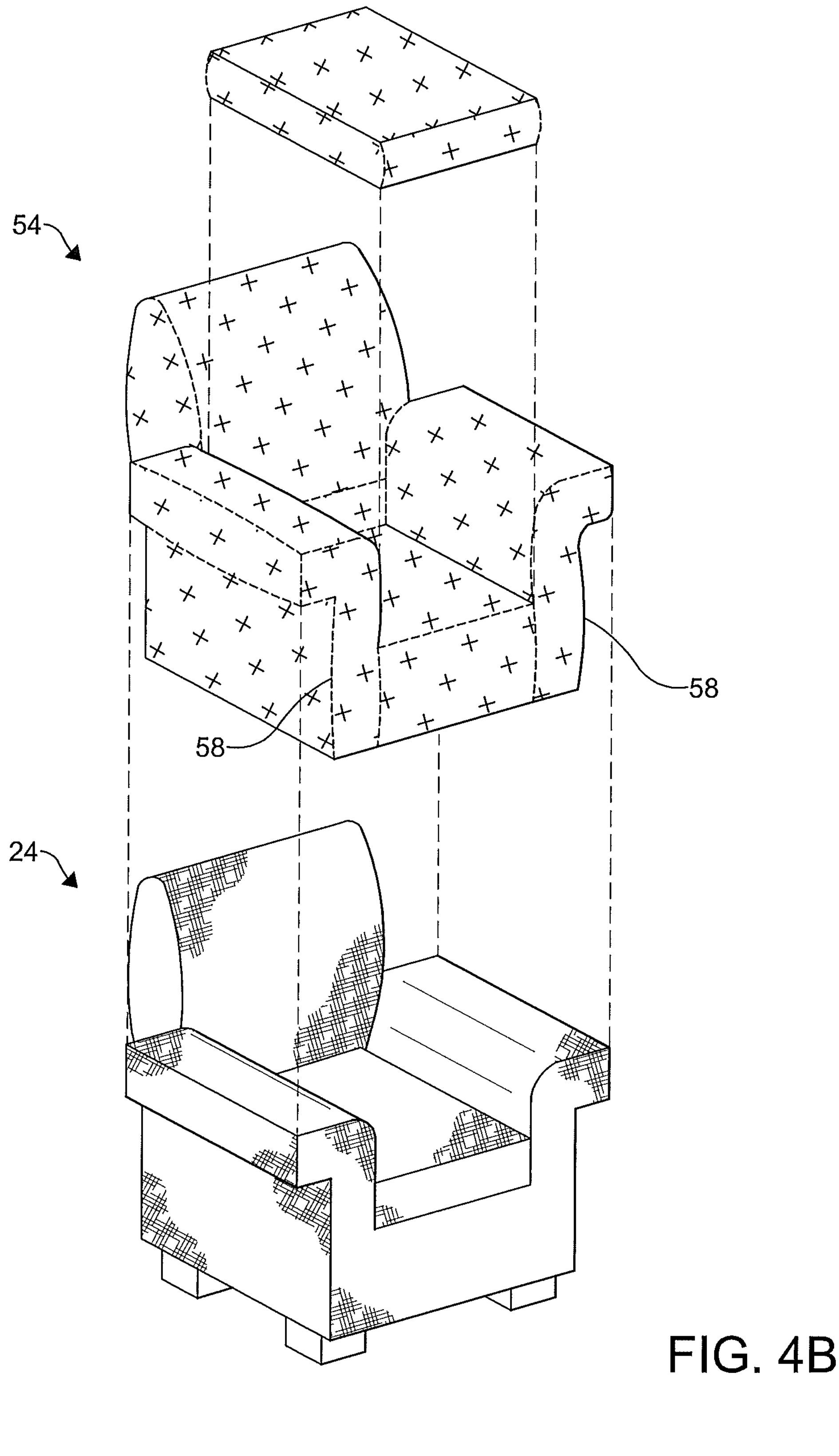
FIG. 4B is a front perspective exploded view illustrating a fitting onto a furniture piece of a slipcover manufactured in accordance with an embodiment of the present disclosure.
Figure 4C:
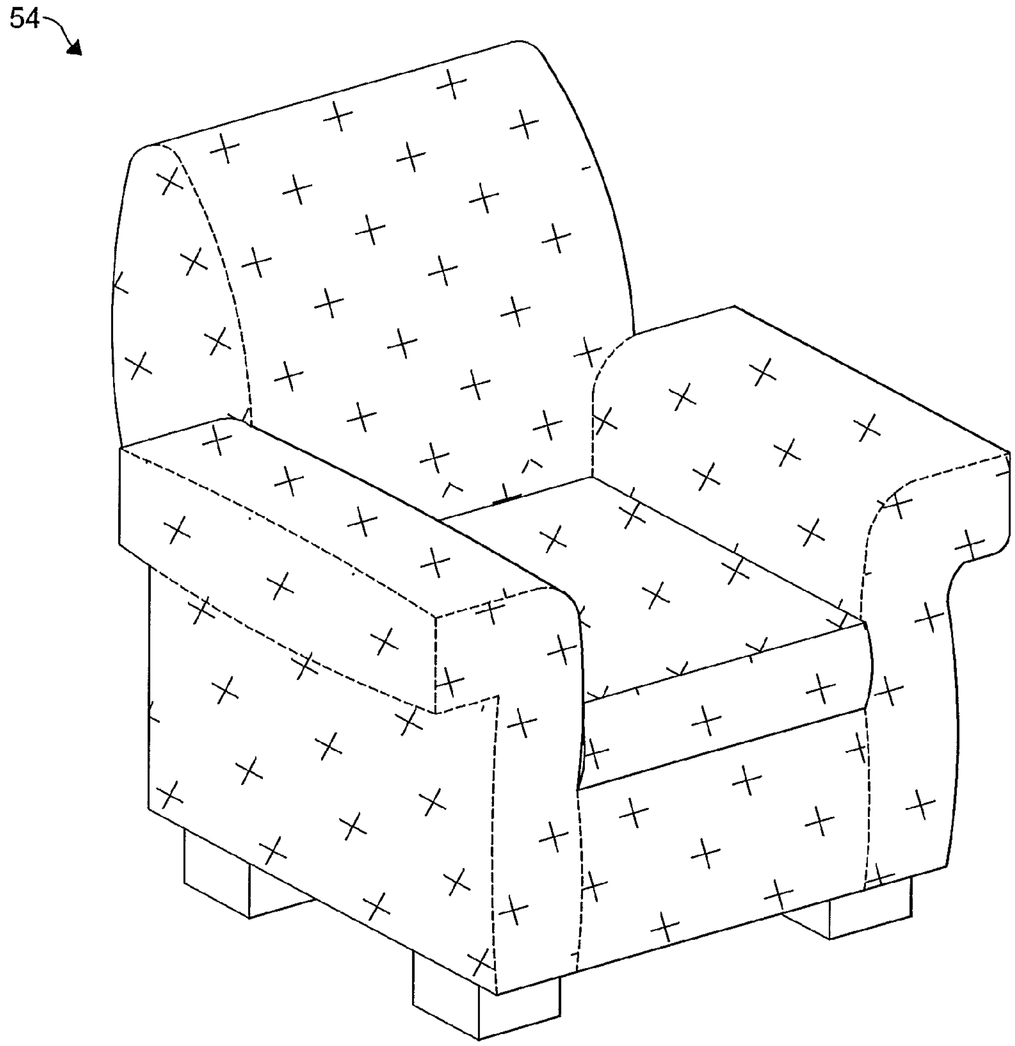
FIG. 4C is a front perspective view of a slipcover manufactured in accordance with the system and method of the present disclosure, as fitted to the furniture piece.

FIG. 4A, FIG. 4B, and FIG. 4C illustrate the fabrication and installation of a slipcover 54 crafted in accordance with the system and method of the present disclosure. FIG. 4A show the plurality of individual fabric panels 56 generated by the output device 18. These fabric panels 56 are joined along their respective boundaries by the operator 22 to create a completed slipcover 54, as shown in FIG. 4B. The completed slipcover 54 is then fitted over the furniture piece 24. In many situations, a unique slipcover 54 will be crafted for seat cushions 25 of the furniture piece 24. FIG. 4C is illustrative of a completed slipcover 54 as fitted to a respective furniture piece 24.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for manufacturing a slipcover for a furniture piece, the method comprising the steps of:

measuring the furniture piece with a data input device to acquire trace data, wherein the data input device is a stylus includes a single position sensor including one of an optical sensor and a roller ball sensor for acquiring the trace data, the position sensor recording as the trace data a relative motion of a tip of the stylus as the tip is moved along a surface of the furniture, the stylus having a memory defined by a tangible computer readable medium coupled to the stylus on which the trace data is recorded and means for communicating the trace data from the memory to a processor for executing instructions to render a plurality of two-dimensional working patterns based upon the trace data;

creating by the processor the plurality of working patterns for the slipcover from the trace data;

cutting a plurality of fabric panels based upon the working patterns for the slipcover; and assembling the fabric panels to form the slipcover for the furniture piece.

2. The method of claim 1, wherein the processor is configured to allow the operator to adjust the dimensional information of the working patterns.

3. The method of claim 1, wherein each of the working patterns of the slipcover is output to an automated fabric cutter that cuts the working pattern from the fabric.

4. The method of claim 1, wherein each of the working patterns is output to a plotter that prints the working pattern onto one of a sheet of paper and a fabric to be cut.

5. The method of claim 1, wherein the step of assembling the slipcover includes a stitching of the cut fabric along respective edges.

6. A system for manufacturing a slipcover for a furniture piece, comprising:

a data input device configured to generate trace data indicative of a shape of a surface, wherein the data input device is a stylus includes a single position sensor including one of an optical sensor and a roller ball sensor for acquiring the trace data, the position sensor recording as the trace data a relative motion of a tip of the stylus as the tip is moved along a surface of the furniture, the stylus having a memory defined by a tangible computer readable medium coupled to the stylus on which the trace data is recorded and means for communicating the trace data from the memory to a processor for executing instructions to render a plurality of two-dimensional working patterns based upon the trace data; and a computer including the processor in communication with the memory of the data input device for executing the instructions to render the plurality of working patterns based upon the trace data from the data input device.

7. The system of claim 6, further including an output device in communication with the processor for producing physical copies of the working patterns.

8. The system of claim 6, wherein the processor is configured to allow the operator to adjust the dimensional information of the working patterns.

9. The system of claim 6, including an automated fabric cutter that cuts the working pattern from the fabric.

10. The system of claim 6, including a plotter that prints the working patterns onto one of a sheet of paper and a fabric to be cut.

* * * * *